(12) United States Patent
Shand et al.

(10) Patent No.: US 9,266,507 B2
(45) Date of Patent: Feb. 23, 2016

(54) ADJUSTABLE BRAKE PEDAL SYSTEM

(71) Applicant: FORD GLOBAL TECHNOLOGIES, LLC, Dearborn, MI (US)

(72) Inventors: Mark Allen Shand, Brighton, MI (US); Daniel A. Gabor, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/293,032

(22) Filed: Jun. 2, 2014

(65) Prior Publication Data

US 2015/0344006 A1    Dec. 3, 2015

(51) Int. Cl.
B60T 7/06 (2006.01)

(52) U.S. Cl.
CPC .............. B60T 7/06 (2013.01); *Y10T 74/20528* (2015.01)

(58) Field of Classification Search
CPC ............ B60T 7/04; B60T 7/042; B60T 7/06; G05G 1/40; G05G 1/405; G05G 5/03; G05G 7/04; Y10T 74/20528; Y10T 74/20888
See application file for complete search history.

(56) References Cited

U.S. PATENT DOCUMENTS

| | | | |
|---|---|---|---|
| 5,832,784 A | 11/1998 | McCallips et al. | |
| 5,996,439 A | 12/1999 | Elton et al. | |
| 6,360,629 B2 | 3/2002 | Schambre et al. | |
| 6,367,348 B1 | 4/2002 | Toelke et al. | |
| 6,782,775 B2 | 8/2004 | Hayashihara | |
| 6,782,776 B2 | 8/2004 | Oberheide et al. | |
| 7,082,853 B2 * | 8/2006 | Fujiwara | 74/512 |
| 7,111,524 B2 | 9/2006 | Kiczek et al. | |
| 7,424,836 B2 | 9/2008 | Takai | |
| 7,568,406 B2 | 8/2009 | Booher et al. | |
| 8,196,695 B2 | 6/2012 | Kim et al. | |
| 8,474,348 B2 | 7/2013 | Soltys et al. | |
| 8,806,976 B2 | 8/2014 | Soltys et al. | |
| 2011/0185843 A1 * | 8/2011 | Soltys et al. | 74/560 |
| 2015/0107402 A1 | 4/2015 | Leem | |

FOREIGN PATENT DOCUMENTS

| | | |
|---|---|---|
| CN | 102822020 A | 12/2012 |
| EP | 1552995 A2 | 7/2005 |
| WO | 2012058330 A2 | 5/2012 |

* cited by examiner

*Primary Examiner* — Thomas Diaz
(74) *Attorney, Agent, or Firm* — Raymond L. Coppiellie; Brooks Kushman P.C.

(57) ABSTRACT

A brake pedal assembly for a vehicle having a brake pedal arm having an initial position and an adjustment subassembly configured to adjust the initial position. The brake pedal assembly is further provided with a preload spring configured to provide a preload force to the brake pedal arm and a preload adjustment cam in cooperation with the brake pedal arm. The adjustment subassembly and the preload spring are configured to change the preload force in response to a change in the initial position.

19 Claims, 3 Drawing Sheets

ADJUSTABLE BRAKE PEDAL SYSTEM

TECHNICAL FIELD

The present disclosure relates to brake pedal systems, specifically to brake-by-wire brake pedal systems.

BACKGROUND

Brake systems in an automobile typically include hydraulically actuated wheel brakes, a master cylinder and a brake pedal assembly connected to the master cylinder via a brake booster. As an operator actuates the brake pedal assembly the brake booster/master cylinder is activated and fluid pressure is sent to the wheel brakes, such as calipers or drum brakes, which in turn applies frictional force to rotors or drums, respectively. The activation of the brake booster/master cylinder is resisted or opposed by a force attributable to fluid pressure in the hydraulic fluid channels and the brake pads or linings pressing against the rotors or drums. This resistive or opposing force increases relative to the movement of the brake pedal assembly as additional braking force is applied to the wheel brakes. Motor vehicle operators perceive this relationship between movement of the brake pedal assembly and increasing resistive force as "pedal feel" of the brake system. Drivers expect this "pedal feel" from all motor vehicle brake systems. In a motor vehicle brake system in which fluid pressure to apply a wheel brake is created independently of a direct mechanical connection between the brake pedal and the brake booster/master cylinder, i.e. a "brake-by-wire" brake system, this "pedal feel" may not be felt by the operator. Therefore it may be advantageous to provide a similar "pedal feel" of a traditional brake system in a "brake-by-wire: brake system.

SUMMARY

In at least one embodiment a brake pedal assembly is provided. The brake pedal assembly may include a brake pedal arm having an initial position and an adjustment subassembly configured to adjust the initial position. The brake pedal assembly may further include a preload spring configured to provide a preload force to the brake pedal arm. The brake pedal assembly may further still include a preload adjustment cam in cooperation with the brake pedal arm, the adjustment subassembly, and the preload spring configured to change the preload force in response a change in the initial position.

In at least one embodiment, a brake pedal assembly is provided. The brake pedal assembly may include a brake pedal arm pivotally connected to a mounting bracket. The brake pedal assembly may further include a resilient member configured to provide a preload force between the brake pedal arm and the mounting bracket. The brake pedal assembly may still further include an adjustment assembly configured to change an initial position of the brake pedal arm. The brake pedal assembly may further still include an adjustment cam pivotally mounted to the adjustment subassembly, configured to engage the brake pedal arm and the resilient member such that in response to a change in the initial position of the brake pedal arm, the preload force is adjusted.

In at least one embodiment, an adjustable brake pedal assembly is provided. The adjustable brake pedal assembly may include a mounting housing defining a pivot and an adjustment subassembly pivotally mounted to the housing at the pivot. The adjustable brake pedal assembly may further include a brake pedal arm pivotally mounted to the housing at the pivot and connected to the adjustment subassembly. The adjustable brake pedal may further still include a preload cam defining a rotation hole, engagement slot, and a cam surface. The adjustment assembly may have a rotation pin extending therefrom and received within the rotation hole. The brake pedal arm may have a locating pin extending therefrom received within the engagement slot, and a spring disposed about the pivot. The spring may have a distal end engaged with the mounting housing and a proximal end slideably contacting the cam surface, such that movement of the brake pedal arm by the adjuster assembly causes the locating pin to engage the engagement slot, thereby rotating the preload cam about the rotation pin and sliding the cam surface along a portion of the proximal end of the spring to vary a preload force of the spring applied to the brake pedal arm.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
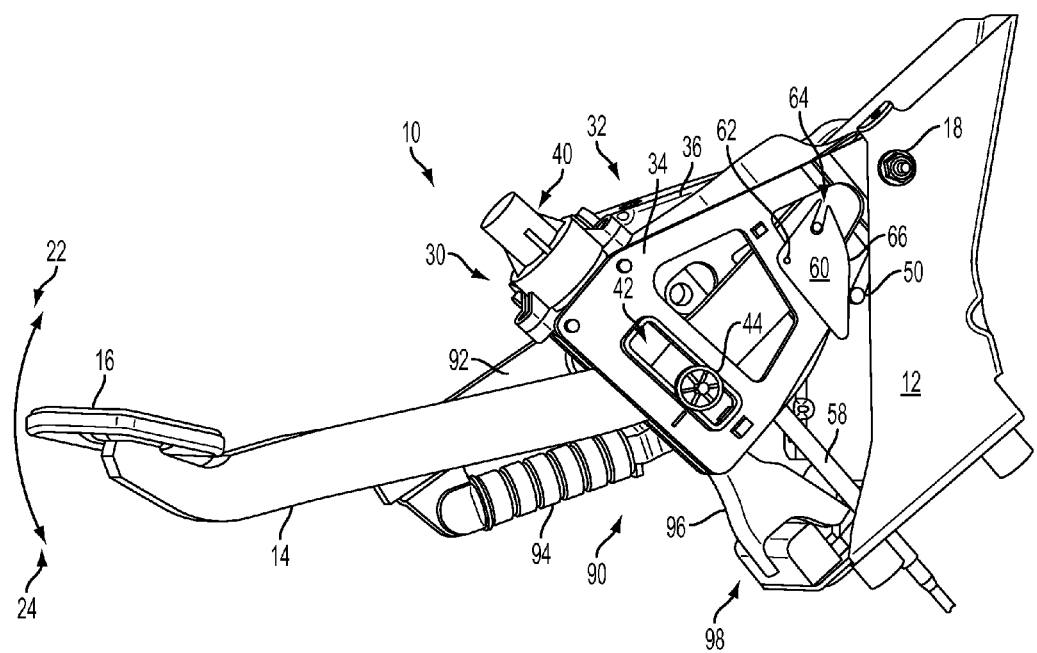
FIG. 1 is a side view of a brake pedal assembly with a preload adjustment cam.

FIG. 1 shows a brake pedal assembly 10 for use in vehicles that may provide a decoupled mechanical link from the brake pedal assembly 10 to the brakes on the vehicle (not shown). The brake pedal assembly 10 may be mounted to the vehicle structure via a mounting housing or mounting bracket 12. The brake pedal assembly 10 may use a position sensor (not shown) to monitor the position of a brake pedal arm 14 pivotally connected to the brake pedal assembly 10. A brake system controller may be in communication with the position sensor and use the position data to appropriately apply braking forces at the wheels through electronic actuators.

These brake-by-wire systems are desirable in that they may disconnect a direct mechanical link from the wheels and brakes on the vehicle and the brake pedal assembly 10, and as such inhibit the transfer of noise, vibration, and harshness from the road, and/or interaction of the braking pads and rotors, to a driver through the brake pedal arm 14. The brake pedal assembly 10 is particularly adapted for use in an electric vehicle or hybrid vehicle, in which varying portions of the braking energy may be used for regenerative braking, while maintaining the same brake pedal arm 14 travel distance.

The brake pedal assembly 10 may be configured as an adjustable brake pedal assembly. The adjustable brake pedal assembly may allow a driver to adjust the initial released position of the brake pedal arm 14 and its associated brake pedal pad 16. An adjustment subassembly 30 may be provided to adjust the initial released position of the brake pedal arm 14 towards a first higher initial position 22 or towards a second lower initial position 24 or a plurality of other initial positions, relative to a vehicle floor.

The brake pedal arm 14 may be disposed within or proximate an adjuster housing 32. The adjuster housing 32 may be provided with a first housing bracket 34 disposed directly opposite and spaced apart from a second housing bracket 36. The brake pedal arm 14 may be disposed between the first and second housing brackets 34, 36. The adjuster housing 32 may be pivotally connected to the mounting bracket 12 via a pivot pin 18. In at least one embodiment, the brake pedal arm 14 and the adjuster housing 32 are pivotally connected to the mounting bracket 12 through the pivot pin 18 and are both configured to pivot about a brake pedal application pivot axis 20 of the pivot pin 18.

A brake pedal adjuster mechanism 40 may be operatively connected to the brake pedal arm 14. The brake pedal adjuster mechanism 40 may be configured to adjust the brake pedal arm initial position between the plurality of initial positions in response to a driver input to adjust the height of the brake pedal pad 16. The first housing bracket 34 may be provided with an elongate slot 42 configured to receive a member 44 extending from a side surface 46 of the brake pedal arm 14. The elongate slot 42 may be configured to engage and retain the member 44 within the slot and limit motion of the brake pedal arm 14 not within the direction of translation.

As the initial released position of the brake pedal arm 14 is adjusted, the brake pedal arm 14 may be configured to pivot about the pivot pin 18. The brake pedal arm 14 may pivot relative to the adjustment subassembly 30 and the mounting bracket 12. As the adjustable brake pedal assembly 10 is actuated or depressed by the driver of the vehicle, the brake pedal arm 14 and the adjustment subassembly 30 may pivot relative to the mounting bracket 12.

In vehicle applications that are not provided with a direct mechanical linkage between the brake pedal assembly 10 and a brake booster or master cylinder, a resilient member 50, such as a return spring or preload spring, may be provided. The resilient member 50 may provide a preload force to the brake pedal arm 14 or to the adjustment subassembly 30.

The preload force may provide a force approximately equivalent to a brake booster preload force when the brake pedal arm 14 is in the initial released position; if there was a direct mechanical linkage between the brake pedal assembly 10 and the brake booster. The resilient member 50 may be disposed about the pivot pin 18 and the pivot axis 20.

Figure 2:
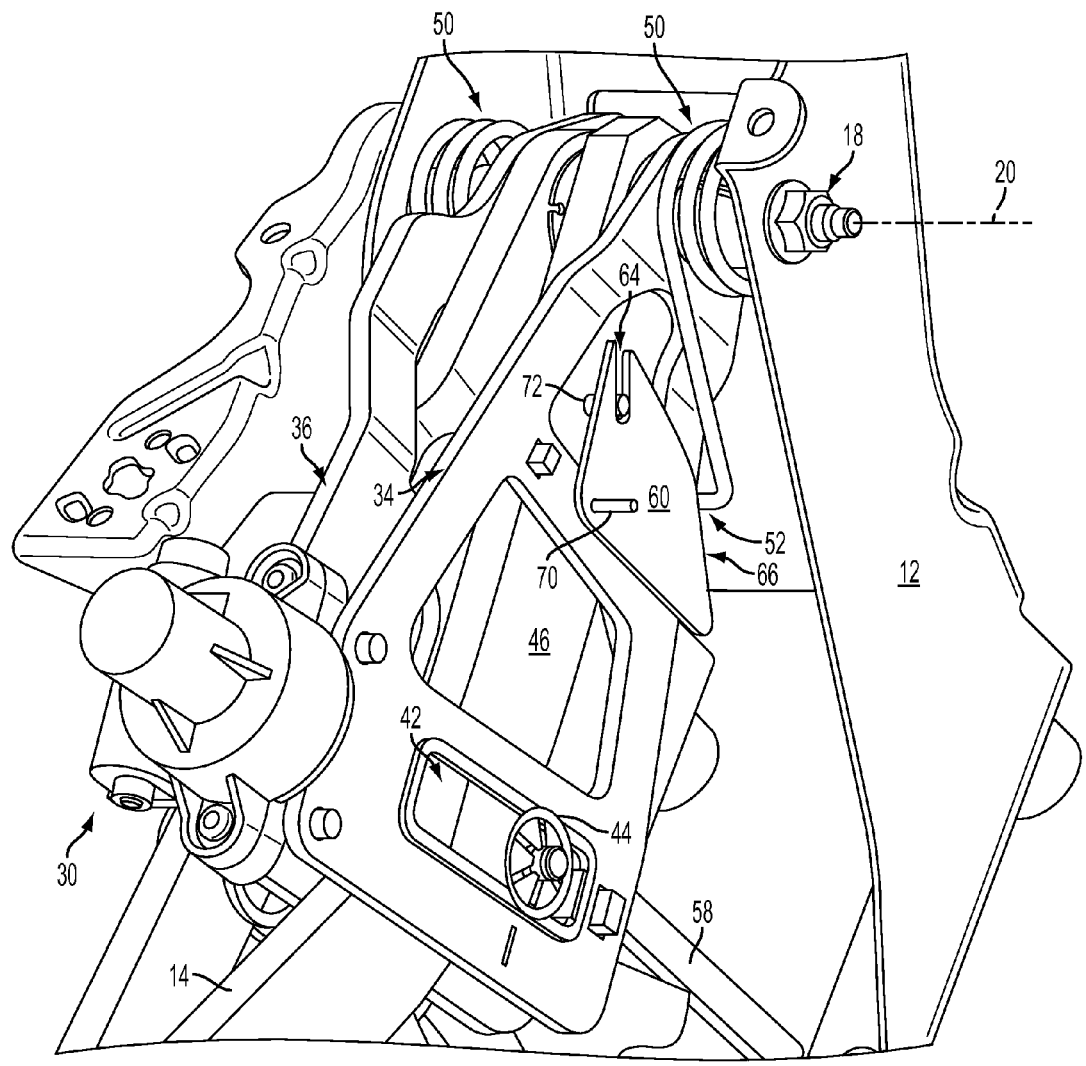
FIG. 2 is an exploded view of the brake pedal assembly of FIG. 1.

Referring now to FIGS. 1 and 2, the resilient member 50 may have a distal end (not shown) in contact with the mounting bracket 12 and a proximal end 52 in contact with the brake pedal arm 14. The proximal end 52 of the resilient member 50 may indirectly apply a preload force to the brake pedal arm 14 by applying a preload force to the adjuster housing 32.

As the initial released position of the brake pedal arm 14 is varied by the adjustment subassembly 30, the preload force provided by the resilient member 50 may vary. As the preload force is varied, a brake pedal application force applied by the driver to the brake pedal pad may also vary. For example, as the brake pedal arm 14 moves towards the first higher initial position 22, an angular position of the resilient member 50 may increase resulting in a decrease in the brake pedal actuation force. The decrease in brake pedal actuation force means that less effort may be required to depress the brake pedal arm 14.

The brake pedal assembly 10 may be provided with a brake booster rod 58. The brake booster rod 58 may extend between the adjustment assembly 30 and a brake booster (not shown), if provided. The brake booster rod 58 may be configured to engage the brake pedal arm 14 to support the initial released position of the brake pedal arm 14. The brake booster rod 58 may be provided with an engagement potion capable of accommodating adjustment of the initial released position of the brake pedal arm 14.

As the brake pedal arm 14 moves towards the second lower initial position 24, an angular position of the resilient member 50 may decrease, resulting in an increase in the brake pedal actuation force. The increase in brake pedal actuation force means that more effort may be required to depress the brake pedal arm 14.

In an effort to maintain a substantially constant brake pedal actuation force a preload adjustment cam 60 may be provided. The preload adjustment cam 60 may be configured to adjust the brake pedal preload force such that the brake pedal actuation force remains substantially constant as the brake pedal arm 14 is adjusted towards either the first or second initial released position, as compared to the initial released position of the brake pedal arm.

The preload adjustment cam 60 may cooperate with the brake pedal arm 14, the adjustment subassembly 30, and the resilient member 50. The preload adjustment cam 60 may be provided with a rotation hole 62 configured to receive a rotation pin or rotation feature 70 extending from the first housing bracket 34. The rotation feature 70 may be spaced apart from the elongate slot 42 and adapted to function as a pivot point for the preload adjustment cam 60.

The preload adjustment cam 60 may define an engagement slot or locating slot 64 configured to receive a locating pin 72 extending from the side surface 46 of the brake pedal arm 14. The locating pin 72 may be spaced apart from the member 44 and configured to locate the brake pedal arm 14 relative to the preload adjustment cam 60. The locating pin 72 may slideably engage the locating slot 64 in response to a change of the initial released position of the brake pedal arm 14. The engagement of the locating pin 72 with the locating slot 64 may rotate the preload adjustment cam 60 about the rotation feature 70.

The preload adjustment cam 60 may define a cam surface 66. The cam surface 66 may slideably engage the proximal end 52 of the resilient member 50. The cam surface 66 may be configured such that as the preload adjustment cam 60 rotates in response to engagement of the locating pin 72 with the locating slot 64, the cam surface 66 slides against a portion of the proximal end 52 of the resilient member 50 to vary the preload force applied by the resilient member 50.

For example, as the brake pedal arm 14 moves towards the first higher initial position 22, the cam surface 66 may counteract an increase in the angular position of the resilient member 50. The cam surface 66 may move the end portion of the resilient member 50, resulting in an increase of the preload force. The increase of the preload force, caused by the movement of the preload adjustment cam 60 may attempt to maintain a substantially constant brake pedal actuation force.

For example, as the brake pedal arm 14 moves towards the second lower initial position 24 the preload adjustment cam may counteract a decrease in the angular position of the resilient member 50. The cam surface 66 may move the proximal end 52 of the resilient member 50, resulting in a decrease of the preload force. The decrease of the preload force, caused by the movement of the preload adjustment cam 60 may attempt to maintain a substantially constant brake pedal actuation force.

Figure 3:
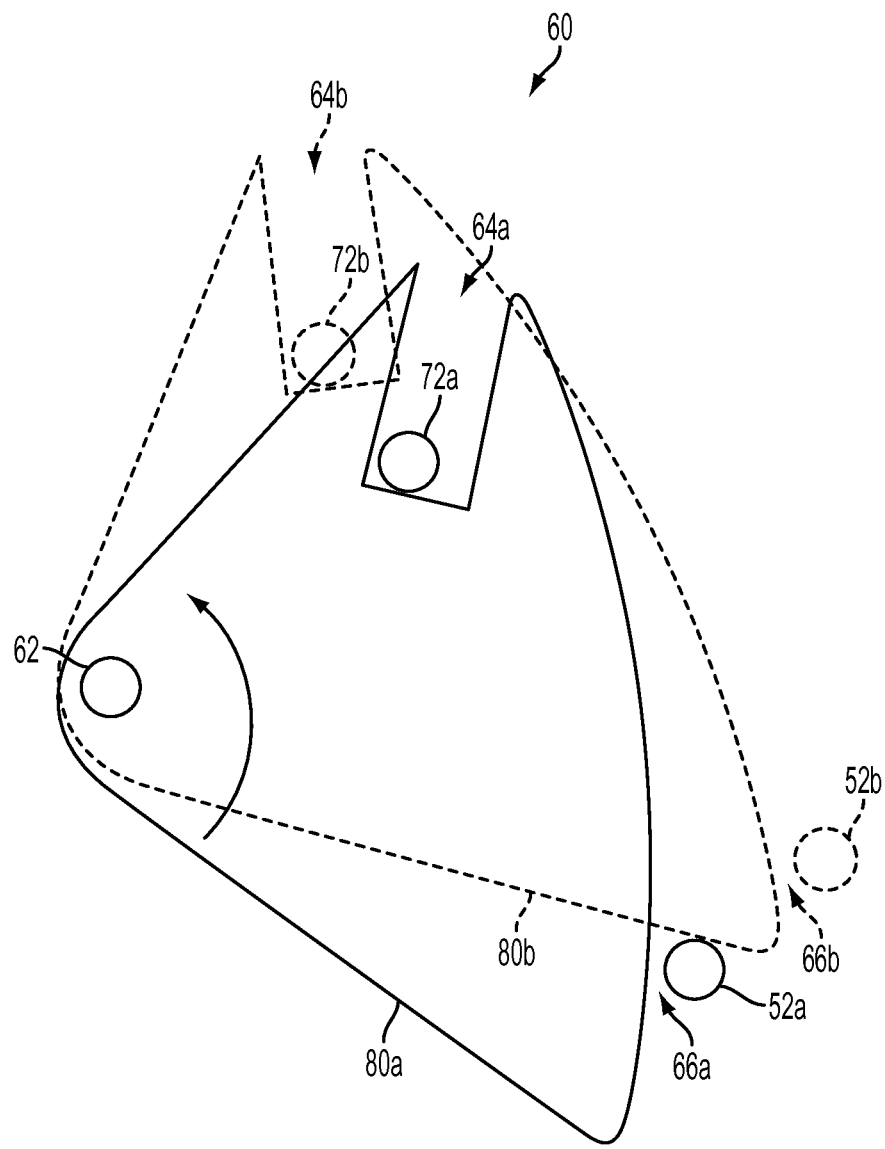
FIG. 3 is a view of the preload adjustment cam in a first position and a second position.

Referring to FIG. 3, an exemplary embodiment of the preload adjustment cam 60 motion in response to movement of the brake pedal arm 14 from the initial released position 80a to the first higher initial position 80b. In the initial released position 80a, the proximal end 52a of the resilient member 50 may engage a first portion of the cam surface 66a.

In the initial released position 80a, the locating pin 72a may be received within the locating slot 64a.

In response to movement of the brake pedal arm 14 from the initial released position 80a to the first higher initial position 80b, the locating pin 72b may be received within the locating slot 64b. The engagement of the locating pin 72b with the locating slot 64b may rotate the preload adjustment cam 60 about the rotation feature 70 received within the rotating hole 62. As the preload adjustment cam 60 rotates, the proximal end 52b of the resilient member may slideably engage the cam surface proximate a second portion of the cam surface 66b. The sliding of the preload adjustment cam 60 from the first portion 66a to the second portion 66b with the proximal end 52 may vary the preload force applied by the resilient member 50 to the brake pedal arm 14.

Conversely, as the brake pedal arm 14 moves from the initial released position 80 to the second lower initial position, the brake pedal arm 14 may be moved away from the driver of the vehicle. As the preload adjustment cam 60 rotates, the sliding engagement of the cam surface with the proximal end 52 may vary the preload force applied by the resilient member 50 to the brake pedal arm 14.

In vehicle incorporating brake-by-wire systems to provide a driver with a similar pedal feel as a conventional braking system incorporating a direct mechanical linkage between the brake pedal arm 14 and the brake booster, a pedal feel simulator 90 may be provided. The pedal feel simulator 90 may effectively simulate the feel of a traditional brake pedal where fluid pressure to apply a wheel brake would be created directly by a user actuating the brake master cylinder by a linkage with a brake pedal arm. The pedal feel simulator may have a pedal feel arm 92 connected to the adjustment subassembly 30 and pivotally connected to the mounting bracket 12.

The pedal feel arm 92 may include a spring loaded cam follower 94 extending therefrom. The spring loaded cam follower 84 may be configured to cooperate with a pedal feel surface 96. The pedal feel surface 96 may be provided as part of a simulator bracket 98 disposed on the mounting bracket 12. The spring loaded cam follower 94 may be pivotally connected to the pedal feel arm 92 and may have a roller in contact with the pedal feel surface 96.

As a driver depresses the brake pedal pad 16, the spring loaded cam follower 94 rides along the pedal feel surface 96, and a pedal feel resistance is provided as the brake pedal arm 14 pivots. The spring loaded cam follower 94 may be rotatably connected to the pedal feel arm 92 and positioned on the pedal feel surface 96 to enhance the force feedback and providing for a more realistic pedal feel as the brake pedal arm moves through its full pivot motion during a vehicle stop.

The pedal feel surface 96 may be provided with a concave region and a convex region. As the spring loaded cam follower 94 rides along the pedal feel surface 96, the cam follower 94 traverses along the concave region, may provide a first pedal feel resistance or range of forces as a function of the concave surface profile. As the cam follower 94 continues to travel along the pedal feel surface 96, the cam follower 94 transitions from the concave region to the convex region. The convex region may provide a second pedal feel resistance or range of forces as a function of the convex surface profile.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake pedal assembly comprising:
   a brake pedal arm having an initial position and a locating pin extending therefrom;
   an adjustment subassembly having a rotation feature extending therefrom and configured to adjust the initial position;
   a preload spring configured to provide a preload force to the brake pedal arm; and
   a preload adjustment cam defining rotation hole configured to receive the rotation feature and a locating slot configured to receive the locating pin such that the preload adjustment cam is in cooperation with the brake pedal arm, wherein the engagement of the locating pin with the locating slot rotates the preload adjustment cam about the rotation feature, and wherein the adjustment subassembly and the preload spring are configured to change the preload force in response to a change in the initial position.

2. The brake pedal assembly of claim 1 wherein the preload adjustment cam defines a cam surface in slideable engagement with an end portion of the preload spring, and rotation of the preload adjustment cam moves the end portion of the preload spring to vary the preload force.

3. The brake pedal assembly of claim 1 further comprises a brake booster rod extending between the adjustment subassembly and a brake booster, wherein the brake booster rod is configured to support the brake pedal arm in the initial position.

4. The brake pedal assembly of claim 1 further comprises a mounting bracket defining a brake pedal application pivot axis and wherein the preload spring is disposed about the brake pedal application pivot axis with a distal end contacting the mounting bracket and a proximal end contacting the preload adjustment cam.

5. The brake pedal assembly of claim 4 wherein the brake pedal arm is configured to pivot about the brake pedal application pivot axis as the initial position is adjusted.

6. The brake pedal assembly of claim 1 further comprising a pedal feel simulator.

7. The brake pedal assembly of claim 6 wherein the pedal feel simulator has a pedal feel arm connected to the adjustment subassembly wherein the pedal feel arm has a spring loaded cam follower extending therefrom and a pedal feel surface extending from a mounting bracket and wherein the spring loaded cam follower extending from the pedal feel arm rides on the pedal feel surface such that a pedal feel resistance is provided as the brake pedal arm pivots about a brake pedal application pivot axis.

8. An adjustable brake pedal assembly comprising:
   a mounting housing defining a pivot;
   an adjustment subassembly pivotally mounted to the housing at the pivot;
   a brake pedal arm pivotally mounted to the housing at the pivot and connected to the adjustment subassembly; and
   a preload cam defining a rotation hole, engagement slot, and a cam surface, wherein the adjustment subassembly has a rotation pin extending therefrom and received within the rotation hole, the brake pedal arm has a locating pin extending therefrom received within the engagement slot, and a spring disposed about the pivot, the spring has a distal end engaged with the mounting housing and a proximal end slideably contacting the cam surface, such that movement of the brake pedal arm by the adjustment subassembly causes the locating pin to engage the engagement slot, thereby rotating the preload cam about the rotation pin and sliding the cam surface along a portion of the proximal end of the spring to vary a preload force of the spring applied to the brake pedal arm.

9. The brake pedal assembly of claim 1 further comprising a brake pedal pad secured to the brake pedal arm, and wherein a depression force required to depress the brake pedal pad remains substantially constant as the as the preload force changes.

10. The brake pedal assembly of claim 8 further comprising a brake pedal pad secured to the brake pedal arm, and wherein a depression force required to depress the brake pedal pad remains substantially constant as the as the preload force varies.

11. A brake pedal assembly comprising:
a brake pedal arm having a pin extending therefrom;
an adjustment subassembly configured to adjust a released position of the arm;
a spring configured to provide a force to the arm; and
a cam pivotally secured to the adjustment subassembly and having a slot and a cam surface, wherein the pin engages the slot to pivot the cam such the cam surface slidably engages the spring to vary the force.

12. The brake pedal assembly of claim 11 wherein the adjustment subassembly has a rotation feature extending therefrom and the cam defines a rotation hole for receiving the rotation feature and engagement of the pin with the slot rotates the cam about the rotation feature.

13. The brake pedal assembly of claim 11 further comprises a brake booster rod extending between the adjustment subassembly and a brake booster, wherein the brake booster rod is configured to support the brake pedal arm in the released position.

14. The brake pedal assembly of claim 11 further comprises a mounting bracket defining a brake pedal application pivot axis.

15. The brake pedal assembly of claim 14 wherein the spring is disposed about the brake pedal application pivot axis with a distal end of the spring contacting the mounting bracket and a proximal end of the spring contacting the cam.

16. The brake pedal assembly of claim 15 wherein the brake pedal arm is configured to pivot about the brake pedal application pivot axis as the released position is adjusted.

17. The brake pedal assembly of claim 11 further comprising a pedal feel simulator.

18. The brake pedal assembly of claim 17 wherein the pedal feel simulator has a pedal feel arm connected to the adjustment subassembly wherein the pedal feel arm has a spring loaded cam follower extending therefrom and a pedal feel surface extending from a mounting bracket and wherein the spring loaded cam follower extending from the pedal feel arm rides on the pedal feel surface such that a pedal feel resistance is provided as the brake pedal arm pivots about a brake pedal application pivot axis.

19. The brake pedal assembly of claim 11 further comprising a brake pedal pad secured to the brake pedal arm, and wherein a depression force required to depress the brake pedal pad remains substantially constant as the as the force provided to the arm varies.

* * * * *